United States Patent [19]

Miller

[11] Patent Number: 4,600,318
[45] Date of Patent: Jul. 15, 1986

[54] THRUST BEARING AND SEAL ASSEMBLY

[75] Inventor: E. K. Miller, Rockford, Ill.

[73] Assignee: Sundstrand Corporation, Rockford, Ill.

[21] Appl. No.: 761,485

[22] Filed: Aug. 1, 1985

[51] Int. Cl.⁴ .................. F16C 33/72; F16C 33/74
[52] U.S. Cl. .................... 384/130; 384/138; 384/150
[58] Field of Search .............. 384/130, 135, 138, 140, 384/149, 150, 151, 368, 420

[56] References Cited

U.S. PATENT DOCUMENTS 3,441,324  4/1969  Libby ........................... 384/130
3,893,735  7/1975  Brenner ........................ 384/145

FOREIGN PATENT DOCUMENTS 138759  6/1949  Australia ...................... 384/130
695536  10/1964 Canada ......................... 384/140
528972  11/1940 United Kingdom ................. 384/151

Primary Examiner—Stuart S. Levy
Assistant Examiner—Thomas R. Hannon
Attorney, Agent, or Firm—Wood, Dalton, Phillips, Mason & Rowe

[57] ABSTRACT

Accelerated wear of the seal in a thrust bearing and seal assembly is avoided by the provision of a bearing having a thrust bearing pad engaging a shoulder on a shaft with the inner diameter of the bearing being spaced from the shaft sufficiently to define a seal receiving space. An axially movable seal having a sealing surface engaging the shoulder is located in the space and is biased against the shoulder by a biasing spring. When deflection occurs, the sealing element is free to yield axially, allowing the loading to be taken up by the thrust pad.

8 Claims, 5 Drawing Figures

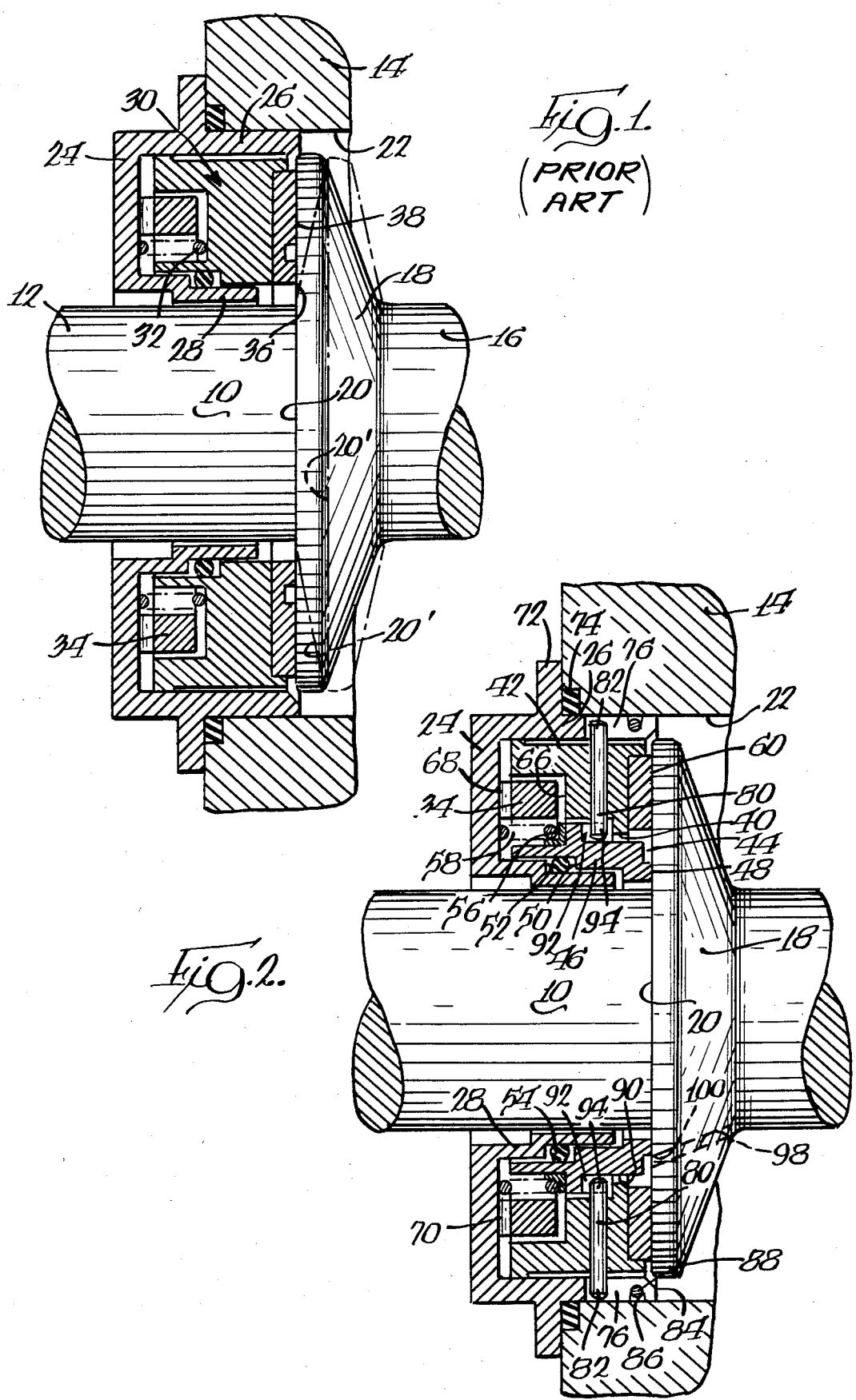

THRUST BEARING AND SEAL ASSEMBLY

FIELD OF THE INVENTION

This invention relates to thrust bearing and seal assemblies and particularly to a thrust bearing and seal assembly which is adapted for use in a gear pump.

BACKGROUND OF THE INVENTION AND DESCRIPTION OF THE PRIOR ART

Gear pumps are widely used in a variety of applications and typically include a housing having an interior pumping chamber which may take on any of a variety of configurations such as an eight-shape or an oval-shape. A pair of meshed gears are disposed within the pumping chamber and are mounted on or are integral with shafts suitably journalled in the housing. On one side of the point whereat the gears mesh there will be provided an inlet and on the opposite side of the point of meshing, an outlet.

Upon rotation of one of the shafts, the gears will rotate in opposite directions drawing fluid, normally a liquid, into the pumping chamber through the inlet and conveying such fluid about the periphery of the chamber in the space between the gear teeth. When the point of meshing is reached, the fluid is forced out of the spaces between the teeth and out of the outlet of the housing.

The input drive shaft for a gear pump must be capable of accepting substantial misalignment between the drive member and the pump elements. This capability can be achieved with a quill shaft with suitable adapters on each end, generally splines, to interconnect the pump elements and the drive member. Lubricating the pump end adaptor with the working fluid raises the need for a rotating shaft seal with one seal member being a radial flange on the quill shaft. The need for the quill shaft to operate in a misaligned condition hence causes the shaft seal to also operate with misalignment.

Since the quill shaft is exposed to the pump working fluid on the pump end, it also is exposed to the pressure of the working fluid which is normally considerably higher than ambient pressure on the drive side of the seal. This pressure differential causes an axial force equal to the pressure differential times the shaft seal projected area. The substantial load thus generated must be opposed by a thrust bearing which is built into the shaft seal such that the seal performs the functions of shaft seal and thrust bearing, and is able to articulate with the shaft misalignment to maintain contact of the bearing and seal members. Such high load can cause the various components of the seal/bearing members to deflect and/or distort which in turn can result in undesirable uneven loading of various components which in turn may result in accelerated wear and/or premature failure.

By way of example, FIG. 1 illustrates a thrust bearing and seal construction made according to the prior art. A shaft 10 has one end 12 which is adapted to be connected to a rotary drive means or the like, exterior of a pump housing 14. The other end 16 of the shaft is adapted to drive, through an articulatable joint, a gear (not shown) within the pumping chamber (not shown) of the pump in a conventional fashion. Intermediate the ends 12 and 16 is an annular flange 18, the side 20 of which facing the shaft end 12 defines an annular bearing shoulder.

The housing 14 includes an opening 22 which receives a generally cup-shaped bearing and seal housing 24. The housing 24 has a cylindrical outer wall 26 within the opening 22 and a cylindrical inner wall 28 in close proximity to the shaft 10. A combined bearing and seal, generally designated 30, surrounds the shaft 10 and is disposed between the inner and outer walls 28 and 26 for generally free axial movement toward and away from the bearing shoulder 20. A compression coil spring 32 interposed between the bearing and seal 30 and the housing 24 biases the former toward the shoulder 20. A gimball washer 34 is also disposed within the housing 24 and is sandwiched between the housing 24 and the bearing and seal 30. The same allows the bearing and seal 30 to cant with universal movement within the housing 24.

In the prior art construction, at the radially inner diameter of the bearing and seal 30 adjacent the shoulder, there is located an annular sealing surface 36 which typically will be formed of carbon or the like. Immediately radially outwardly of the sealing surface 36 is a carbon thrust bearing pad 38. Differing or identical forms of carbon may be used in forming the components 36 and 38 as desired.

In any event, when the shoulder 20 is not distorted or deformed as a result of forces typically occurring within the pump, the same will occupy the solid line position illustrated in FIG. 1. As a consequence, the sealing surface 36 and the bearing pad 38 are substantially uniformly loaded. However, when axial thrust loads are applied along the shaft 10, the shoulder 20 may tend to become convex as the load attempts to literally extrude the flange through the bearing and seal 30. An exaggerated showing of such an occurrence is shown in dotted lines and designated 20' in FIG. 1.

As a result of such a distortion and/or deflection, it can be seen that the loading on the bearing and seal 30 has shifted from a uniform radial loading of the bearing and seal 30 to one that is located predominantly radially inwardly and against the sealing surface 36. Because the sealing surface 36, and not the bearing pad 38 is receiving a substantial portion of the loading for which it was not intended, accelerated wear can result.

The present invention is directed to overcoming one or more of the above problems.

SUMMARY OF THE INVENTION

It is the principal object of the invention to provide a new and improved thrust bearing and seal assembly for use in a gear pump. More specifically, it is an object of the invention to provide an assembly wherein shaft distortion resulting from forces occurring during operation of the mechanism in which the bearing and seal assembly is used do not result in unequalized loading of bearing and seal components that would lead to accelerated wear of the seal.

An exemplary embodiment of the invention achieves the foregoing object in a thrust bearing and seal assembly including a shaft. An annular shoulder is located on the shaft and an annular bearing and seal housing is disposed about the shaft and opens towards the shoulder. An annular thrust bearing is located about the shaft and within the housing and has a bearing pad abutting the shoulder. The bearing has an inner diameter spaced from the shaft sufficiently to define an annular seal receiving space. Means are interposed between the housing and the bearing for allowing the bearing to cant within the housing and an annular seal is disposed within the seal receiving space about the shaft and is axially movable therein relative to the bearing. The seal has a peripheral sealing surface facing the shoulder. Means are provided within the housing for biasing the sealing surface against the shoulder.

As a consequence of such construction, when the shaft shoulder distorts, the seal may yield against the bias of the biasing means rather than absorb a disproportionately high portion of the loading caused by such distortion. Thus, the yielding of the seal will allow the loading to be carried by the bearing pad thereby limiting the loading of the seal to that of the biasing means, to reduce seal wear.

In a preferred embodiment, the means for allowing the bearing to cant includes a gimball washer which engages the housing at two diametrically opposite points and which engages the bearing at two diametrically opposite locations that are angularly spaced from the first mentioned diametrically opposite points.

In a preferred embodiment, a generally axially directed passage extends through the shoulder and opens to the bearing radially outwardly of the sealing surface thereby providing a passage for a lubricant and/or coolant to the bearing.

In one embodiment, the housing is provided with a radially outer, annular wall with spaced generally axially extending slots in such wall. The seal has a radially outer surface with generally axially extending slots in the surface and which are angularly alignable with corresponding slots in the wall. All of the slots are open ended adjacent the shoulder and generally radially directed pins carried by the bearing extend into angularly aligned slots in the wall and in the seal. A removable retaining means is mounted on the wall for removably retaining the pins in the slots in the wall to thereby retain the bearing within the housing and the seal within the bearing.

In addition, such pins prevent the bearing and the seal from rotating with the shaft.

Other objects and advantages will become apparent from the following specification taken in connection with the accompanying drawings.

DESCRIPTION OF THE DRAWINGS

FIG. 1 is, as noted earlier, a view of a prior art construction of a bearing and seal assembly, specifically, a sectional view thereof;

FIG. 2 is a view similar to FIG. 1 but illustrating a bearing and seal assembly made according to the invention;

DESCRIPTION OF THE PREFERRED EMBODIENT

Figure 3:
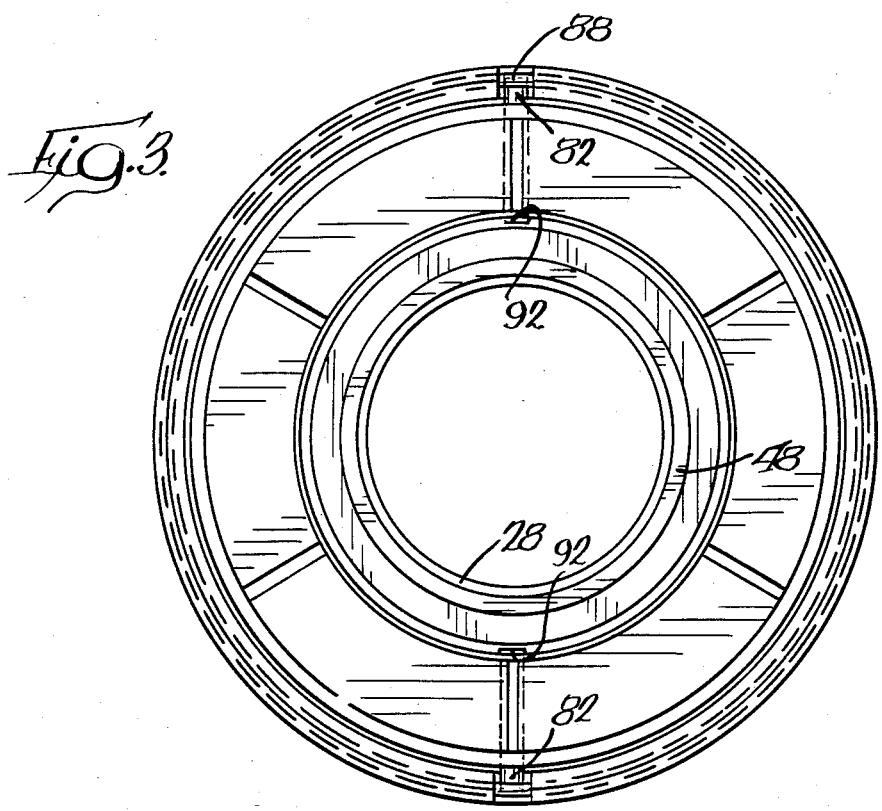
FIG. 3 is an elevational view of the face end of the bearing and seal assembly.
Figure 4:
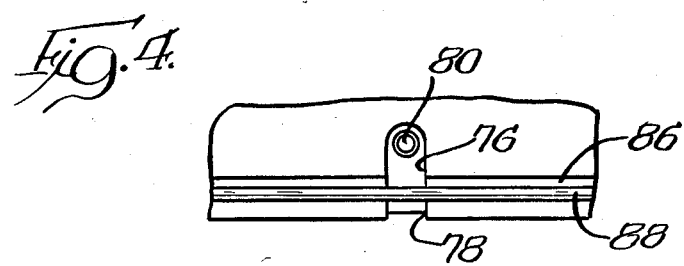
FIG. 4 is a fragmentary plan view of retaining means.

An exemplary embodiment of a thrust bearing and seal assembly made according to the invention is illustrated in FIGS. 2-5 and will be described with reference thereto. To the extent that the thrust bearing and seal assembly share components common to the prior art construction illustrated in FIG. 1, they will be given the same reference numerals; and such components, in the interest of brevity, will not be redescribed.

As can be seen from comparing FIGS. 1 and 2, the radially inner diameter 40 of a bearing element 42 disposed within the housing 24 is considerably greater than the radially inner diameter of the seal and bearing 30 shown in FIG. 1. As a consequence, the spacing provides for a seal receiving space 44 that is generally annular about the shaft 10. Within the space 44 there is located an annular sealing element 46 having a sealing surface 48 in engagement with the shoulder 20. The sealing element 46 includes an annular step 50 facing away from the shoulder 20. The step 50, in turn, faces a step 52 on the cylindrical inner wall 28 of the housing 24.

An O-ring seal 54 is disposed between the shoulders 50 and 52 and it will be seen that in the normal case, the spacing between the shoulders 50 and 52 is considerably greater than a diameter of the cross section of the O-ring seal 54. It will also be seen that the sealing element 46 is free to move axially within the seal receiving space 44. As a result of the above relationship between the shoulders 50, 52 and the O-ring seal 54, it will be appreciated that the latter may roll within the area between the shoulders 50 and 52 to provide only minimal resistance to axial motion of the sealing element 46 within the space 44 and yet seal the interface between the cylindrical inner wall 28 and the sealing element 46.

Oppositely of the step 50, the sealing element is provided with a step 56. A compression coil spring 58 providing a relatively light biasing force abuts the shoulder 56 as well as the housing 24 to lightly bias the sealing element 46 and the sealing surface 48 thereof into sealing engagement with the shoulder 20. At the same time, the relatively light bias provided by the spring 58 allows the sealing element 46 to move axially to the left as viewed in FIG. 2 against the bias of the spring 58 in the event of deflection of the shoulder 20 such as shown in dotted lines in FIG. 1.

As noted previously, the invention contemplates a bearing element 42.separate from the sealing element 46. On the side of the bearing 42 facing the shoulder 20, the same may be provided with a pad 60 of suitable bearing material. The pad 60 engages the shoulder 20.

Figure 5:
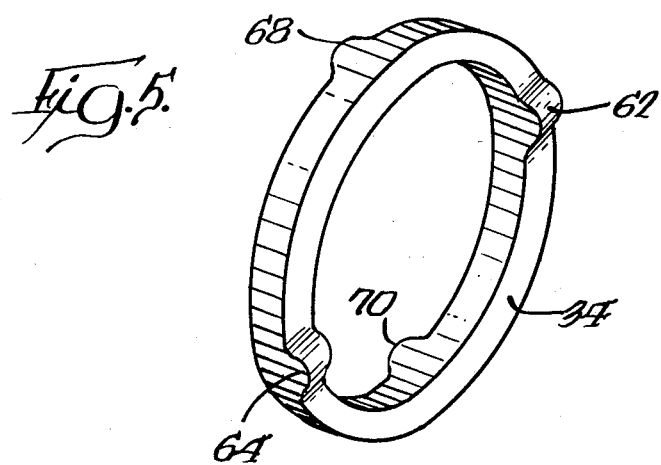
FIG. 5 is a perspective view of a gimball washer employed in the bearing and seal construction.

Interposed between the bearing 42 and the housing 24 is a gimball washer 34. As seen in FIG. 5, the gimball washer 34 is a relatively stiff washer. On one side, the same includes diametrically opposed lobes 62 and 64 which engage the bearing 42 within a step 66 located oppositely of the pad 60 essentially on two radially extending lines spaced 180° apart.

On the other side, the gimball washer includes lobes 68 and 70 which likewise make radial line contact, spaced 180°, with the housing 24. It will further be observed that the spacing between the lobes on opposite sides of the washer 34 is 90°. Thus, the gimball washer provides a universal mounting for the bearing 42 allowing the same to cant universally within the housing 24. This ability allows the bearing 42, and thus the pad 60 to cant responsively to misalignment of the rotational axis of shaft 10 as may be required during operation of the mechanism in which the thrust bearing and seal assembly is used.

The outer wall 26, includes a radially outwardly directed, peripheral flange 72 which may abut an outer wall of the pump housing 14 when the bearing is installed and a suitable seal 74 may be disposed at the interface between the two.

Within the bore or opening 22 in the machine housing 14 in which the bearing and seal housing 24 is received, the cylindrical outer wall 26 may be provided with diametrically opposite, axially directed slots 76 which are open ended at 78 (FIG. 4) immediately adjacent the shoulder 20.

Radially extending pins 80 are located in bores and carried by the bearing 42 and have ends 82 disposed within the slots 76. Immediately adjacent an axial end 84 of the cylindrical outer wall 26, the exterior surface of the same may include a peripheral groove 86. A resilient retaining ring 88 is located in the groove 86 and is operable to capture pins 80 within the slots 76 thereby capturing the bearing 42 within the housing 24.

If for any reason, it is desired to disassemble the thrust bearing and seal assembly, one need merely remove the resilient retaining ring 88 in the groove 86 and the bearing 42 may be removed from the housing 24.

The cylindrical outer surface 90 of the sealing element 46 is also provided with axially directed slots 92 which may be angularly alignable with the slots 76. The pins 80 have radially inwardly directed ends 94 disposed in the slots 92. The slots 92 are also open ended on their sides adjacent the shoulder 20.

Thus, the pins 80 further serve to retain the sealing element 46 within the housing 24 when the seal 42 is in place. The pins 80 perform the additional function of preventing the bearing 42 or the sealing element 46 from rotating with the shaft 10.

According to the invention, a passage 98 extends through the flange 18 at a radially outward angle and opens at a port 100 radially outwardly of the sealing surface 48 and radially inwardly of the inner diameter of the pad 60. The presence of the passage 98 when the bearing assembly is utilized in a gear pump, is to centrifugally pump a certain amount of the working fluid flow to the righthand side of the flange 18 via the customary leakage paths found in such pumps, through passage 98 to the bearing and seal—shoulder interface for lubrication and/or cooling purposes. Such fluid will not however, leak from the bearing and seal assembly by reason of the presence of the O-ring 54 and the seal 74 as well as the sealing contact made by the sealing surface 48 against the shoulder 20.

From the foregoing, it will be appreciated that should the shoulder 20 distort or deform under loading as shown in the exaggerated form in dotted lines in FIG. 1, the seal 46 will merely move axially to the left as viewed in FIG. 2 under such loading so that the loading will be placed against the thrust pad 60 as is desired. Consequently, undesirable heavy loading of the sealing surface 48 is avoided to thereby prolong the life of the thrust bearing and seal surface.

I claim:

1. A thrust bearing and seal assembly for use in a gear pump or the like comprising:
    a shaft;
    an annular shoulder on said shaft;
    an annular cup-shaped bearing and seal housing disposed about said shaft and opening toward said shoulder;
    a gimball washer within said housing and having two, diametrically opposite points of contact therewith;
    an annular thrust bearing about said shaft and within said housing and having a bearing pad abutting said shoulder and a surface opposite said pad abutting said washer at two diametrically opposite locations, angularly spaced from said two diametrically opposite points, said bearing having an inner diameter spaced from said shaft sufficiently to define an annular, seal receiving space;
    an annular seal disposed within said space about said shaft and axially movable therein relative to said bearing, said seal having a peripheral sealing surface facing said shoulder; and
    means within said housing and engaging said seal for biasing said sealing surface against said shoulder.

2. The thrust bearing and seal assembly of claim 1 wherein said housing has a peripheral wall; spaced generally axially extending slots in said wall; generally radially directed pins carried by said bearing and extending into said slots, a peripheral groove in the radially outer side of said peripheral wall, and a retaining ring in said groove for capturing said pins in said slots and said bearing within said housing.

3. The thrust bearing and seal assembly of claim 2 wherein a radially outer surface of said seal includes axial slots and said pins extend radially inward of said bearing to be disposed in the slots in said seal.

4. The thrust bearing and seal assembly of claim 1 wherein said housing includes a radially inner, annular wall in close proximity to said shaft, said inner wall including an annular step facing the shoulder on said shaft; and said seal has a radially inward located annular step facing but spaced from the annular shoulder on said wall; and an O-ring seal disposed in the space between the annular steps on said wall and said seal and sealingly engaging said wall and said seal.

5. The thrust bearing and seal assembly of claim 1 further including a passage extending through said shoulder and opening to said bearing radially outward of said sealing surface to allow a lubricating or coolant fluid to flow to said bearing pad.

6. A thrust bearing and seal assembly for use in a gear pump or the like comprising:
    a shaft;
    an annular shoulder on said shaft;
    an annular bearing and seal housing disposed about said shaft and opening toward said shoulder;
    an annular thrust bearing about said shaft and within said housing and having a bearing pad abutting said shoulder, said bearing having an inner diameter spaced from said shaft sufficiently to define an annular, seal receiving space;
    means interposed between said housing and said bearing for allowing said bearing to cant within said housing;
    an annular seal disposed within said space about said shaft and axially movable therein relative to said bearing, said seal having a peripheral sealing surface facing said shoulder and radially inwardly of said pad; and
    means within said housing and engaging said seal for biasing said sealing surface against said shoulder.

7. The thrust bearing and seal assembly of claim 6 wherein said housing has a radially outer, annular wall with spaced generally axial extending slots in said wall; and wherein said seal has a radially outer surface with generally axially extending slots in said surface and angularly alignable with corresponding slots in said wall; all of said slots being open ended adjacent said shoulder; generally radially directed pins carried by said bearing and extending into angularly aligned ones of said slots in said wall and said surface; and removable retaining means mounted on said wall for removably retaining said pins in the slots in said wall to thereby retain said bearing within said housing and said seal within said bearing.

8. A thrust bearing and seal assembly for use in a gear pump or the like comprising:

a shaft;

an annular shoulder on said shaft;

an annular bearing and seal housing disposed about said shaft and opening toward said shoulder;

an annular thrust bearing about said shaft and within said housing and having a bearing pad abutting said shoulder, said bearing having an inner diameter spaced from said shaft sufficiently to define an annular, seal receiving space;

means interposed between said housing and said bearing for allowing said bearing to cant within said housing;

an annular seal disposed within said space about said shaft and axially movable therein relative to said bearing, said seal having a peripheral sealing surface facing said shoulder;

means within said housing and engaging said seal for biasing said sealing surface against said shoulder; and a generally axially directed passage extending through said shoulder and opening to said bearing radially outwardly of said sealing surface.

* * * * *